UNITED STATES PATENT OFFICE.

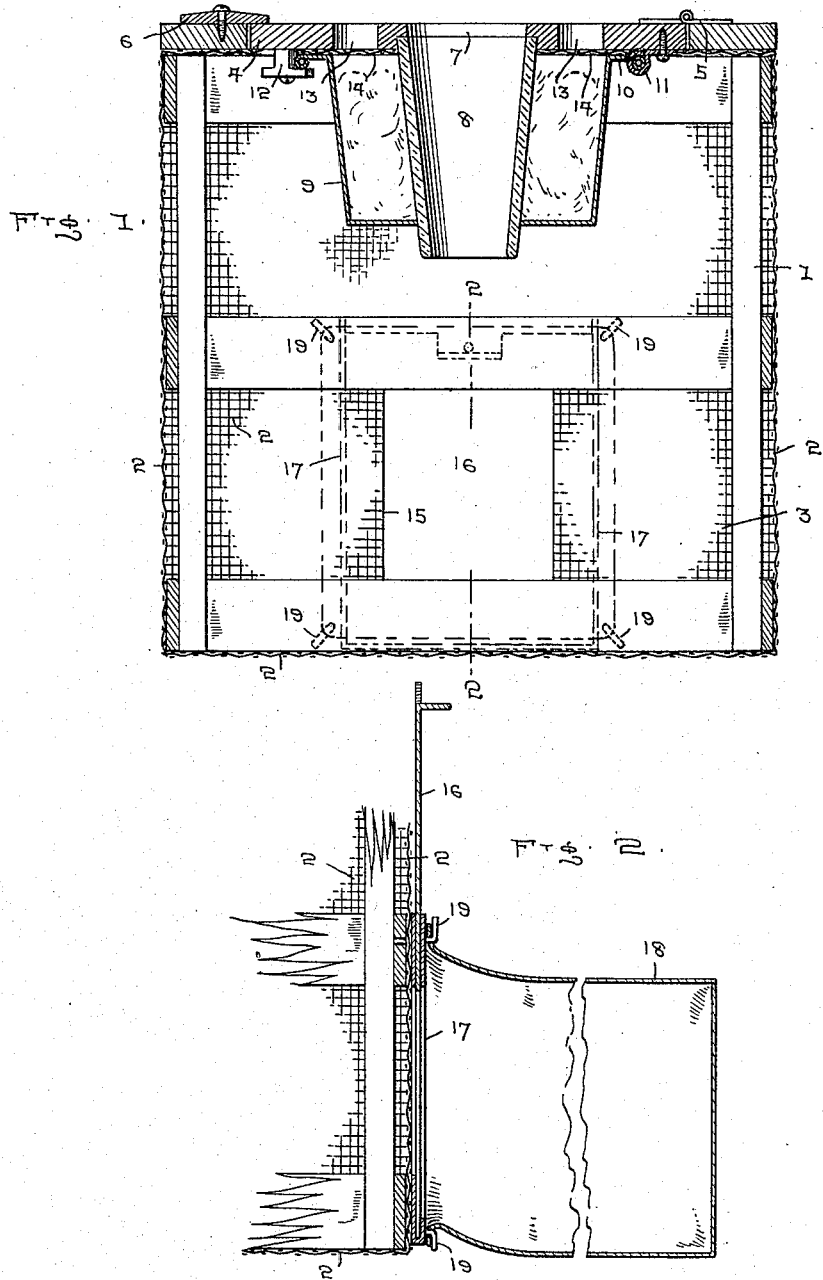

MATTHEW J. SLOAN, OF ARCH CREEK, FLORIDA.

TRAP CONSTRUCTION.

1,176,610. Specification of Letters Patent. Patented Mar. 21, 1916.

Application filed October 7, 1915. Serial No. 54,569.

*To all whom it may concern:*

Be it known that I, MATTHEW J. SLOAN, a citizen of the United States, residing at Arch Creek, in the county of Dade and State of Florida, have invented certain new and useful Improvements in Trap Construction; and I do hereby declare the following to be a full, clear, and exact description of the invention, such as will enable others skilled in the art to which it appertains to make and use the same.

My invention relates to new and useful improvements in traps and more particularly to that class employed for entrapping rodents and similar animals and my object is to provide a frame, the walls of which are covered with wire or similar material, to form a housing.

A further object is to provide a removable cover for the housing through which is formed openings one of which is to form a passage for the rodents to the interior of the housing.

A further object is to provide a transparent tube and position the same through the bait receptacle the upper end of which is in registration with the opening in the cover for the reception of the rodents. And a further object is to provide means for removing the rodents from the trap.

Other objects and advantages will be hereinafter set forth and more particularly pointed out in the accompanying specification.

In the accompanying drawings which are made a part of this application, Figure 1 is a central vertical sectional view through the trap, and Fig. 2 is a detailed sectional view as seen on line 2—2 of Fig. 1.

Referring to the drawings in which similar reference numerals designate corresponding parts throughout the several views, 1 indicates the frame which may be constructed of any suitable material and of any preferred shape and size, said frame being surrounded by wire gauze 2 or similar material to form a housing 3.

The upper end of the housing 1 is provided with a door 4, one edge of which is secured to the housing by means of hinges 5, while the opposite edge thereof is held in closed position by means of a button or latch 6. Extending transversely through the central portion of the door is an enlarged opening 7 through which the rodent may gain access to the interior of the housing and in order to prevent the rodent from leaving the housing, a tubular sleeve 8 preferably of glass or other transparent material is positioned below the opening 7 and in registration therewith and if desired, the sleeve may be made tapering from its upper to its lower end.

The sleeve 8 is held in position below the door 4 by means of a receptacle 9 through the central portion of which the sleeve extends, said receptacle being adapted to receive bait for attracting the rodents into the housing. The upper edge of the receptacle 9 is surrounded by a flange 10, one edge of which is provided with a hinge 11 and by means of which the receptacle is hingedly attached to the door, while the opposite edge of the receptacle is normally held in engagement with the under face of the door by means of keepers 12. The door 4 is also provided with a plurality of openings 13 which surround the openings 7 and through these openings, the rodents may view the food or bait within the receptacle, but cannot gain access as the under face of the door is covered with wire 14.

In removing the rodents from the trap, an opening 15 is formed through the wire 2 adjacent the lower edge of the housing which is normally closed by a sliding door 16 which fits in suitable guides 17 attached to the frame 1 and it will be readily seen that when the door is open, the rodents can readily leave the interior of the housing. To readily retain the rodents so that they may be killed, a bag or similar article 18 is disposed over the opening 15 and the open end is held in position thereover by engaging the same with hooks 19 carried by the frame 1 and when all of the rodents have passed into the bag, the door 16 is again closed and the open end of the bag released from the hooks when the rodents may be carried to any suitable point for disposing of them.

In preparing the trap for use, the door 4 is swung open and the keepers 12 released from the edge of the receptacle 9 when said receptacle will swing away from the door carrying the sleeve 8 therewith. Suitable bait is then placed in the receptacle, after which the receptacle is reëngaged with the keepers and the door swung to closed position and fastened, and if desired a quantity of food may be entered through the sleeve 8 into the bottom of the housing or placed thereon previous to closing the door 4. The trap is then placed in a suitable position and the rodents attracted by the smell of the food, will climb up the sides of the housing and descend through the sleeve 8 into the interior of the housing and as the receptacle 9 is preferably formed of tin or similar metal, the rodents are unable to retain a hold upon the receptacle, but fall to the bottom of the housing. It will likewise be seen that in view of the smooth surface of the interior of the sleeve 8, when the rodent enters the upper end of the sleeve in an endeavor to gain access to the food within the receptacle, will readily descend through the sleeve into the housing as it is impossible to gain a purchase on the face of the sleeve.

Having thus fully described my invention, what I claim as new and desire to secure by Letters Patent is:

1. In a trap, the combination with a frame having a wire covering, of a door hinged to said frame, a bait receptacle secured to said door, and a transparent sleeve carried by the receptacle, said door having an opening registering with one end of the sleeve.

2. In a trap, the combination with a housing, of a door hinged thereto, said door having a central opening and a plurality of smaller openings, a bait receptacle below said door, and a transparent sleeve registering with the central opening and extending through said receptacle.

In testimony whereof I have signed my name to this specification in the presence of two subscribing witnesses.

MATTHEW J. SLOAN.

Witnesses:
E. H. HILLYER,
G. D. FLEMING.

Copies of this patent may be obtained for five cents each, by addressing the "Commissioner of Patents, Washington, D. C."